US009864632B2

(12) United States Patent
Hauser et al.

(10) Patent No.: US 9,864,632 B2
(45) Date of Patent: Jan. 9, 2018

(54) SYSTEM AND METHOD FOR TRANSFER OF AN APPLICATION STATE BETWEEN DEVICES

(75) Inventors: Robert R. Hauser, Frisco, TX (US); Robert DeAnna, Frisco, TX (US); Paul Lipari, Frisco, TX (US)

(73) Assignee: Open Invention Network, LLC, Durham, NC (US)

( * ) Notice: Subject to any disclaimer, the term of this patent is extended or adjusted under 35 U.S.C. 154(b) by 493 days.

(21) Appl. No.: 13/212,057

(22) Filed: Aug. 17, 2011

(65) Prior Publication Data

US 2013/0046893 A1  Feb. 21, 2013

(51) Int. Cl.
*G06F 15/173* (2006.01)
*G06F 9/48* (2006.01)

(52) U.S. Cl.
CPC .................. *G06F 9/4856* (2013.01)

(58) Field of Classification Search
CPC ........ G06F 3/017; G06F 3/038; G06F 3/1454; G06F 15/173; G06F 9/4856; H04L 12/1827; H04L 65/1069; H04L 63/10; H04L 67/36; H04L 65/1083
USPC ......... 709/226, 218, 232, 203–204; 455/457, 455/41.2
See application file for complete search history.

(56) References Cited

U.S. PATENT DOCUMENTS 7,064,675 B2 * 6/2006 Zigmond et al. .......... 340/12.53
8,799,496 B2 * 8/2014 Phillips et al. ............... 709/231
2005/0283522 A1 * 12/2005 Parkkinen .......... G06F 17/30575
                                                   709/210
2007/0118659 A1 * 5/2007 Cuny et al. .................... 709/227
2008/0183841 A1 * 7/2008 Isokawa .................. H04L 67/38
                                                   709/217
2009/0257433 A1 * 10/2009 Mutikainen et al. ......... 370/392
2009/0287831 A1 * 11/2009 Nakagawa .............. H04L 63/08
                                                   709/228
2009/0320073 A1 * 12/2009 Reisman ........... G06F 17/30873
                                                   725/51
2010/0161818 A1 * 6/2010 Capuozzo ........... H04L 12/2812
                                                   709/229
2010/0235523 A1 * 9/2010 Garcia ................ H04L 12/1822
                                                   709/228
2010/0312832 A1 * 12/2010 Allen et al. .................... 709/204

(Continued)

*Primary Examiner* — Benjamin M Thieu
(74) *Attorney, Agent, or Firm* — Hayes and Boone, LLP

(57) ABSTRACT

To enable continuous execution of an application, a system and method for transferring an application state is provided. A gesture corresponding to a transfer act is detected by a gesture detection module in a first device executing the application. The first device communicates with a registration and relay server to determine eligible transfer recipients based on criteria such as location and/or devices that are currently executing the application. A transfer recipient is selected and platform independent application state Data Transfer Objects are generated that describe the state of execution on the first device. The application state DTOs are transferred via the server to the recipient device which enacts the application state DTOs to continue the execution of the application on the recipient device. Because the application state DTOs are platform independent, the application state can be transferred to almost any device that is able to execute the application.

14 Claims, 14 Drawing Sheets

(56) References Cited

U.S. PATENT DOCUMENTS

| | | | |
|---|---|---|---|
| 2011/0055007 A1* | 3/2011 | Kitagawa | G06F 9/4443 705/14.49 |
| 2011/0072470 A1* | 3/2011 | Morris | H04L 65/1063 725/62 |
| 2011/0081923 A1* | 4/2011 | Forutanpour et al. | 455/457 |
| 2011/0161525 A1* | 6/2011 | Tanimoto | H04L 12/4625 709/249 |
| 2011/0197147 A1* | 8/2011 | Fai | 715/753 |
| 2011/0219105 A1* | 9/2011 | Kryze | G06F 15/16 709/223 |
| 2011/0314153 A1* | 12/2011 | Bathiche et al. | 709/225 |
| 2012/0038550 A1* | 2/2012 | Lemmey et al. | 345/156 |
| 2012/0057081 A1* | 3/2012 | Petersson et al. | 348/734 |
| 2012/0079119 A1* | 3/2012 | Gill et al. | 709/227 |
| 2012/0154293 A1* | 6/2012 | Hinckley et al. | 345/173 |
| 2012/0226736 A1* | 9/2012 | Falchuk et al. | 709/203 |
| 2012/0250858 A1* | 10/2012 | Iqbal | H04L 9/0861 380/44 |
| 2012/0289227 A1* | 11/2012 | Dhodapkar | 455/435.1 |
| 2013/0007194 A1* | 1/2013 | Doleh | H04L 67/2814 709/217 |
| 2013/0167242 A1* | 6/2013 | Paliwal | 726/26 |

\* cited by examiner

SYSTEM AND METHOD FOR TRANSFER OF AN APPLICATION STATE BETWEEN DEVICES

FIELD OF THE INVENTION

This disclosure relates to the communication of application information between two devices.

BACKGROUND OF THE INVENTION

With modern networking of a large number of device platforms and device types, applications are being developed with multiple instances so that the application can run on almost any device parameter set, i.e. the combination of device type, device, operating system, display screen, etc.

The present inventors have recognized that it may be possible and indeed desirable to be able to transfer a running application from one device to another so that the application may appear to have continuous execution as it is transferred from one device to the next. The inventors have further recognized that it would be desirable if the state transfer could occur irrespective of differences in the parameter set between the originating device and the recipient device.

What is required is a system and method that may facilitate the transfer of a state of an executing application from one device to another.

SUMMARY OF THE INVENTION

In one aspect of the disclosure, there is provided a method for transferring a state of an application on a first device to a second device. The method may comprise executing the application on the first device. While the application is acting, detection of a transfer act may trigger a transfer of the application state to a recipient device. Transferring the state may comprise generating a platform independent representation of an application state of the application, determining a recipient device, and providing the platform independent representation of the application state to the recipient device.

In one aspect of the disclosure, there is provided a system comprising a first device, a server and one or more recipient devices. The first device executes an application comprising application logic, a state transfer module, and a gesture detection module. The state transfer module receives a gesture detection from the gesture detection module and in response communicates a find recipients request to the server. The server determines one or more eligible recipients for an application state transfer from the first device from the one or more second devices and communicates the eligible recipients to the first device. The first device selects a transfer recipient from the eligible recipient and communicates a platform independent representation of the application state to the transfer recipient via the server. The transfer recipient device receives the representation of the application state from the server and executes the application including the application state received from the server.

In one aspect of the disclosure, there is provided a non-transitory computer readable medium of a device comprising instructions for executing an application, detecting a transfer act, generating a platform independent representation of a state of execution of the application in response to detection of the transfer act, and communicating the state of execution of the application to a device on a network.

BRIEF DESCRIPTION OF THE DRAWINGS

Reference will now be made, by way of example only, to specific embodiments and to the accompanying drawings in which.

DETAILED DESCRIPTION OF THE INVENTION

As will be described in greater detail below, embodiments of the disclosure enable the transfer of a running application from one device to another nearby device with the ease of a simple transfer act such as a gesture. Other embodiments provide a module/system for developers to add this capability to any application and in other embodiments a service is provided for transferring the state of any application to another nearby device.

Examples in which the transfer of the state of an application may be useful include, without limitation:

a user viewing a map on a smartphone wants to view it on a nearby PC;

a user viewing directions/navigation wants to transfer the directions to another person's smartphone;

a user playing a turn-based game on a smartphone wants to let another nearby smartphone user finish the game;

a user watching a video/show on their phone wants to transfer it to a bigger screen (PC or entertainment system) when they get home.

Figure 1:
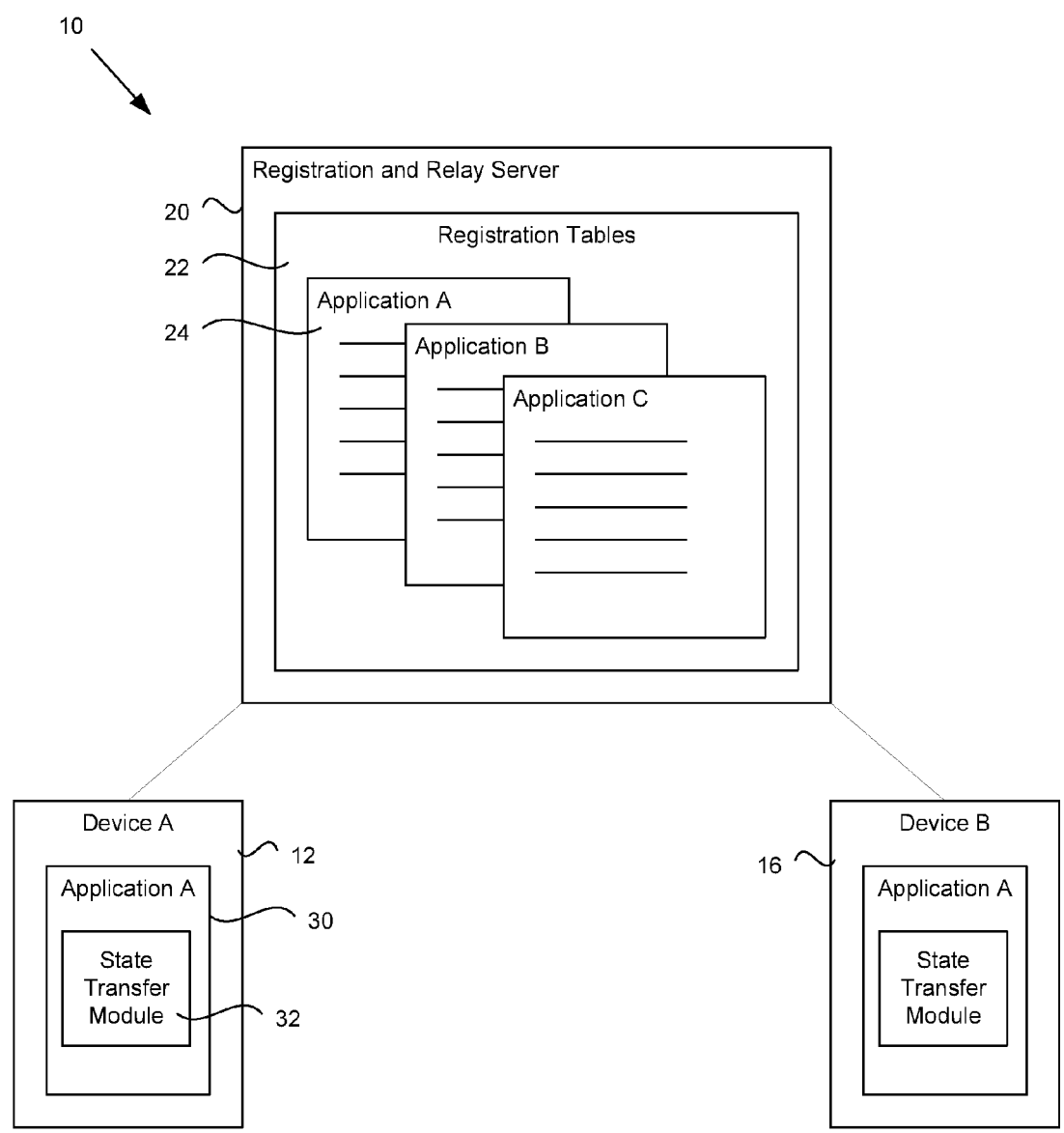
FIG. 1 depicts a system for providing an application state transfer.

With reference to FIG. 1, there is shown a system 10 that may be used to provide the state transfer service. The system 10 includes a registration and relay server 20 that stores registration tables 22. Each registration table, e.g. registration table 24 for Application A stores entries that represent devices and their parameters that are known to be executing or have executed the respective application.

The registration and relay server 20 may be accessible to device A 12 and device B 16 through a network. In one embodiment, the registration and relay server 20 may be a component of a wide area network such as the internet, for example to enable User A to throw a game state from Device A 12 to User B at Device B 16. The network may therefore include one or more of a wireless telecommunications network (e.g. GSM) or a DSL or cable network. The registration and relay server 20 may also be a component of a LAN such as a home network, Bluetooth network, zigbee network, etc. Such a LAN may be deployed, for example, in a home to enable the User A to throw a state of video content from their mobile device to a home television, home computer, or other device within the home network. In another embodiment, device 12 and device 16 may be able to communicate directly peer to peer so that the application state can be transferred between devices without the need for the registration and relay server 20.

In the embodiment depicted in FIG. 1, Device A 12 and Device B 16 are both depicted as mobile communication devices, though other device types are possible, including fixed computers, laptops, fixed telephone devices, televisions (portable and fixed), etc.

The network that connects each of Device A 12 and Device B 16 to the server 20 may be the same network or a different network. For example, if Device A 12 and Device B 16 are both mobile telephone devices, they may both connect to the registration and relay server 20 via a mobile telecommunications network. In another example, if Device B 16 is instead a home computer, it may connect with the registration and relay server 20 via a cable modem and IP based network.

Figure 2:
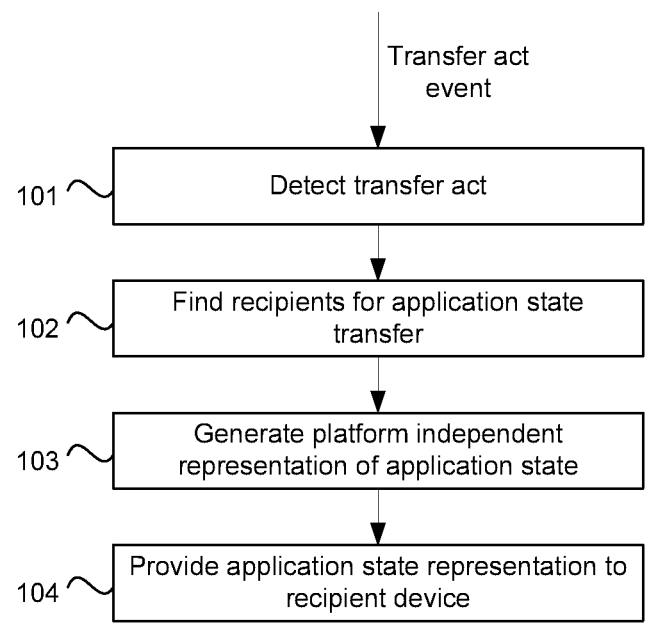
FIG. 2 depicts an application state transfer process.

Device A 12 is shown executing Application A 30 which has embedded within it a state transfer module 32 as will be described in greater detail below. Using the state transfer module, user A at device A 12 is able to transfer the state of the executing application A 30 from device A 12 to device B 16. A process for the state transfer is depicted in the flowchart 100 of FIG. 2. At step 101, Device A 12 executing Application A 30 detects a transfer act. In response to the transfer act, an application state transfer process is triggered. A recipient device is determined (step 102) and Device A 12 generates a platform independent representation of the state of the Application A 30 (step 103). Device A 12 then provides the platform independent representation of the application state to the recipient device B 16 (step 104). It should be noted, that unless otherwise apparent, the order of the steps is not important. For example, the platform independent representation of the application state may be generated simultaneously with or prior to the step of determining the recipient device.

The transfer act that triggers the application state transfer process may be a menu driven action, such as on the keyboard or touchscreen, may be embedded in the application, such as running content getting to a certain point. In one particular embodiment, the transfer act may be a preconfigured and/or prerecorded gesture such as a shake, that may be detected by a gesture detection module described in more detail below.

Figure 3:
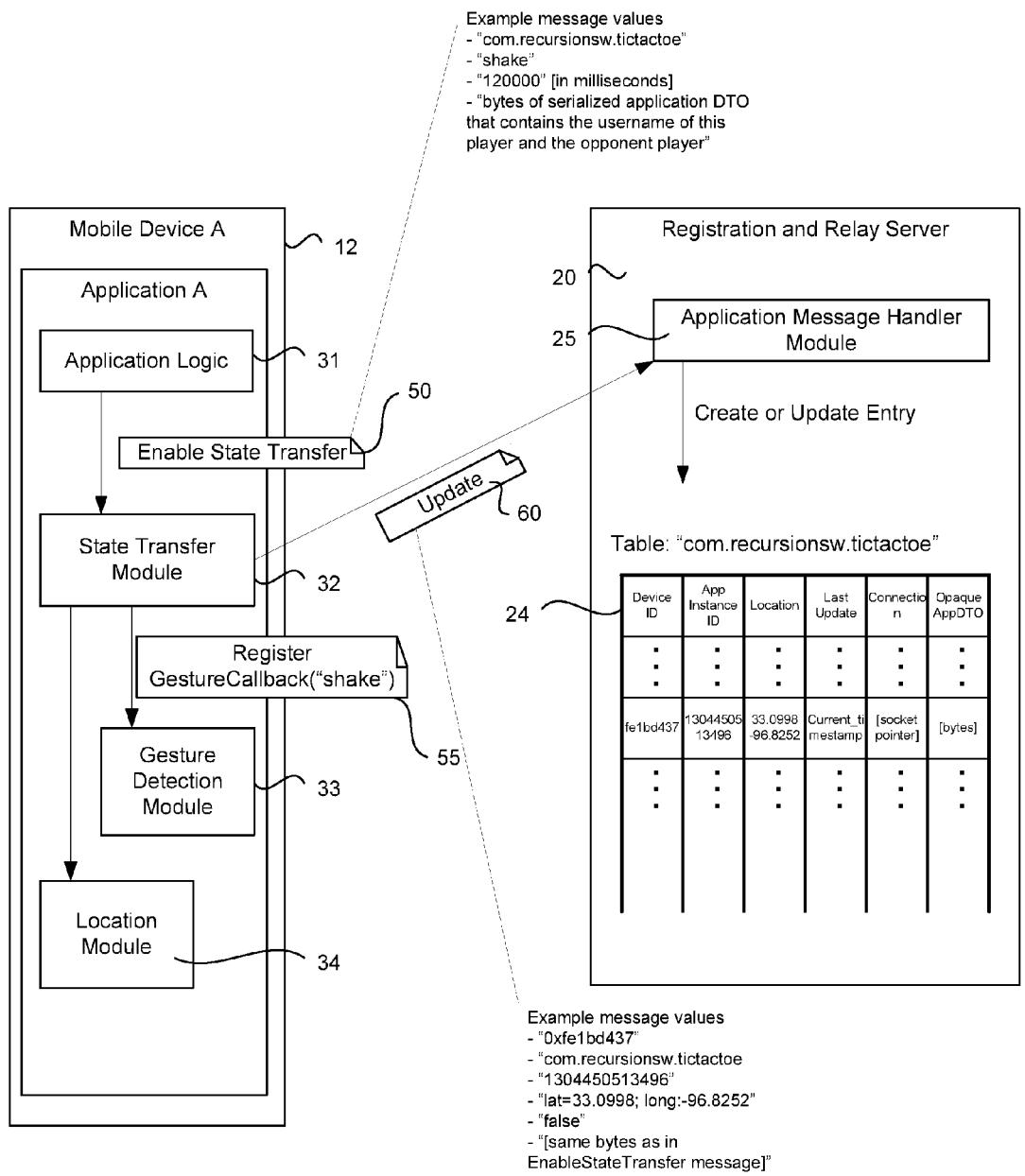
FIG. 3 depicts the components of the system performing a registration process.

Further details of an application that embodies the state transfer capabilities and of the registration and relay server are depicted in FIG. 3. The application 30 includes application logic 31 for executing the application, such as a game, navigation program, multi-media program, etc. The application logic 31 communicates with the state transfer module 32, which in turn is in communication with a gesture detection module 33 and, optionally, with a location module 34. The gesture detection module 33 may communicate with other device components, such as accelerometers, GPS units, etc, in order to calculate and detect preconfigured gestures. Further details of gesture detection processes are described in the current assignee's patent applications, U.S. patent application No. 13/078,935 filed Apr. 2, 2011, now U.S. Pat. No. 8,825,643 and U.S. patent application No. 13,078,938 filed Apr. 2, 2011, now U.S. Pat. No. 9,094,813, the entire contents of which are incorporated herein by reference. The location module 34 may provide location in a variety of ways, including latitude/longitude (GPS), shared wifi access point, single hop network topology neighbor, shared ambient sensor data (e.g. same ambient sound profile, same accelerometer profile, same ambient light profile, etc.), and the like.

Figure 4:
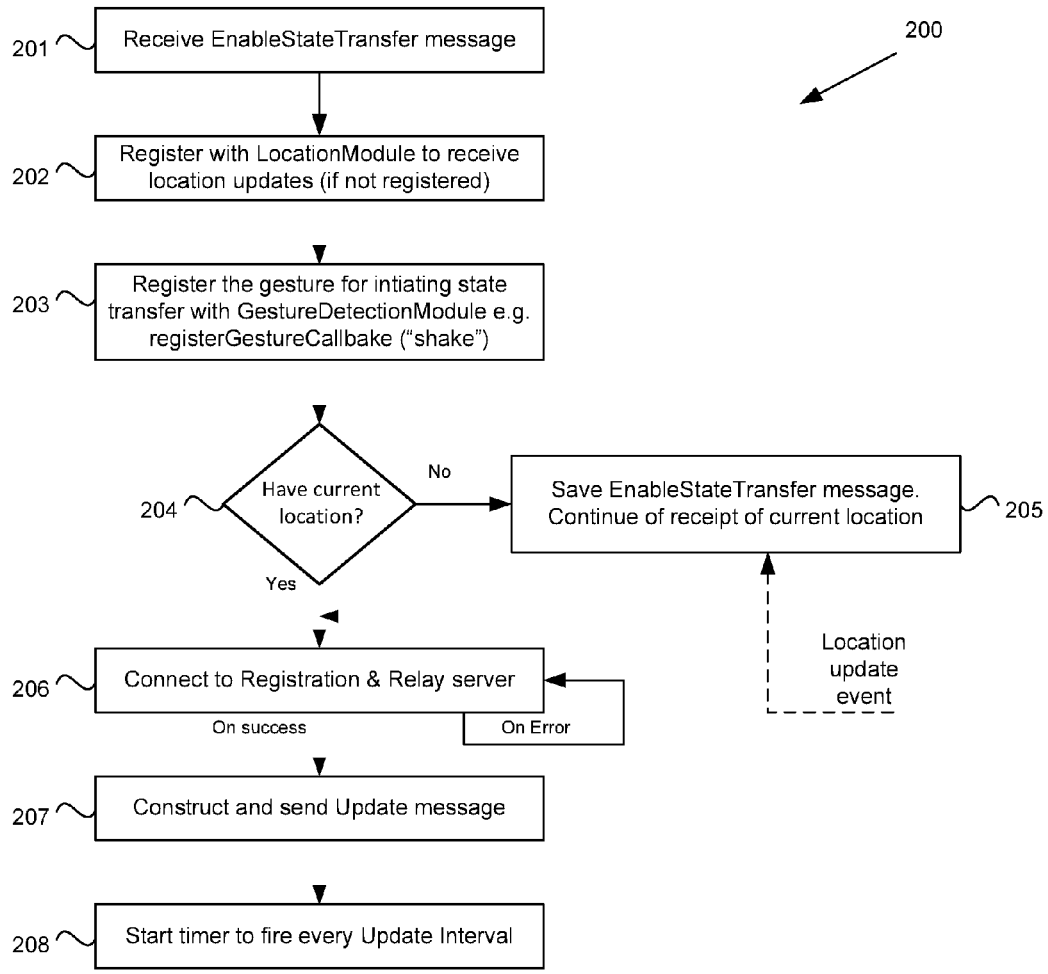
FIG. 4 depicts a flowchart of the registration process.

In order to configure the application to be able to transfer the state of the executing application and to enable the application to receive the state transfer from another executing application instance, the application initiates a registration with the registration and relay server, i.e. the application logic calls enableTransfer( ) method on the State Transfer Module. The registration process is shown in more detail in the flowchart 200 of FIG. 4. With reference to FIGS. 3 and 4, at step 201, the application logic 31 calls an enableTransfer( ) procedure of the state transfer module 32 sending an EnableStateTransfer message. The Application startup inside the Application Logic is typically the event/place where enableTransfer( ) takes place. In alternative embodiments, the application programmer can choose to expose the state transfer capability explicitly e.g. by asking the user, by adding a preference to the application settings or even by some other application relevant event like being near a specific location. The application logic level decision may or may not involve the user.

Figure 5:
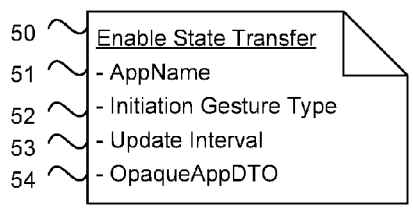
FIG. 5 depicts an embodiment of an Enable State Transfer message.

An embodiment of the EnableStateTransfer message 50 is depicted in FIG. 5. The message 50 includes fields for the Application Name 51, Initiation Gesture Type 52, Update Interval 53 and Opaque Application Data Transfer Objects 54. These fields will be described in more detail below. The Enable State Transfer field values are provided by the application developer who calls the enableTransfer( ) API. For example, the API signature could be—boolean enableTransfer(String appName, GestureType initiationGesture, long updateIntervalMillis, Object[ ] opaqeAppDTOs). The structure as depicted in FIG. 3 has the State Transfer Module handle all interaction with the gesture detection module. The application logic needs only indicate which gesture is being used for state transfer, so as not to interfere with other gestures used by the application logic. The update interval is for maintaining connectedness with a heartbeat. All push based services such as the presently described application state transfer operating on mobile devices need to have a heartbeat operating at an interval to maintain connectedness with a service, i.e. the Registration and Relay server. Since the frequency of this heartbeat effects battery life etc, the application developer who writes the application logic is expected to provide a reasonable value as the Update Interval. The Update Interval is a balance. A longer interval limits the update frequency which can save battery life but location info of a device up at the Registration and Relay Server may become stale and may possibly allow the device to be disconnected and unable to receive an app state transfer. A shorter interval consumes battery with more frequent network activity, but keeps location info fresh up at the Registration and Relay Server and it is less likely that the device becomes disconnected and thus can more reliably receive an app state transfer.

The Opaque Application Data Transfer Objects (DTO)s represent the actual application state. The content of these DTOs is specific to the application logic and are written and provided by the application developer. For example, for a navigation application the DTOs could contain the state of the route: 10 waypoint objects 4 marked "consumed" with a timestamp, the $5^{th}$ waypoint object marked as "current", etc. For a game application the DTOs could contain the state of the game board, the users playing the game, etc. The DTOs are opaque, meaning that nothing internal to them is used by the State Transfer Module or the Registration and Relay Server. They can be encrypted with a key that is not available to the Registration and Relay Server. They are passed through to the Application Logic to enable the Application Logic to show the user relevant information when transferring the app state.

To provide further insight into the present embodiments, a specific example will be described. Say, at a park, Alice and Bill are playing tic-tac-toe and so are Claire and Deb. Evan and Fred have the tic-tac-toe app too but are not playing right now. All six of these mobile devices have registered with the server and update occasionally (according to Update Interval) but none may be connected at the time Claire needs to leave. Claire gestures (e.g. "shake") which communicates to the Registration and Relay server which does a location comparison and sends back 5 sets of opaque app DTOs . . . a set for Alice, Bill, Deb, Evan, and Fred. These 5 choices (DTO sets) are passed to the Application Logic which (possibly decrypts them and) deserializes them. Claire's application logic layer sees that Deb is already playing Claire and discards that choice. The app logic also sees that Alice and Bill are playing each other. Claire may be presented with the following choice:
Offer to Transfer Game to: [Alice] or [Bill] (playing now), [Evan], [Fred].

Claire selects a name. If Claire picks Evan and Evan accepts then Deb will be playing Evan going forward. If Claire picks Alice and Alice accepts then Alice will be playing Deb going forward (and Bill may get a message "Alice left the game"). Alternately, a new tic-tac-toe game could be created and Alice would have her game with Bill ongoing and a new game with Deb (continuing in Claire's place). This kind of logic happens in the Application Logic layer. But it is important to note that the registration and relay server does have opaque application DTOs so that relevant information can be provided to a user who initiates state transfer even when the possible recipients devices are currently not connected (unreachable).

If not already registered, the state transfer module 32 registers with the location module 34 of the application and/or the device to receive location updates (step 202). At step 203, the state transfer module 32 registers a callback 55 for the gesture type from the gesture field 52 of the EnableStateTransfer message 50 with the gesture detection module 33. In the example above, this would enable Claire to just flick her wrist and pick "Evan" and leave.

If the current location is not available for any device making the initial update to the Registration and Relay Server (determination step 204), then the EnableStateTransfer message is saved and the registration process is suspended (step 205) until a location update is received. Otherwise, if the current location is available, the state transfer module 32 connects to the registration and relay server 20 (step 206) and constructs and sends an update message (step 207). The state transfer module 208 then starts a timer to fire at a period corresponding to the Update Interval 53 of the EnableStateTransfer message 50.

Figure 6:
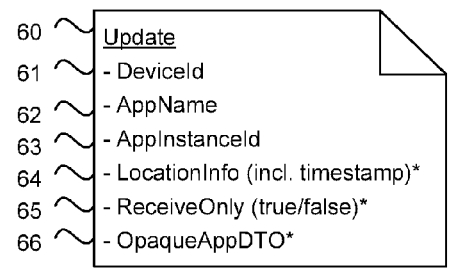
FIG. 6 depicts an embodiment of an Update message.

An embodiment of an update message 60 is depicted in FIG. 6. The update message 60 may include, without limitation, the following fields:

DeviceID 61—a unique ID per physical device.
Application Name 62—a name identifying a type of the application that can share the same state.
Application Instance ID 63—a unique ID for each running application of the type "AppName".
Location Info 64—any/all information used to locate the device in physical proximity to other devices. The location information may be in various forms, such as latitude/longitude/altitude with a timestamp. The location information may also include passive sensor data such as ambient light, sound, accelerometer readings, etc.
ReceiveOnly 65—This Boolean field is used to indicate that a device lacks a functioning gesture detection module and is thus only able to receive a state transfer but not send one (true). If the device is able to initiate and receive state transfers, the value is set to false. The ReceiveOnly is an optional parameter and may be used to indicate that a device is not equipped with a functioning gesture detection module or has a non-functioning gesture detection module. In one embodiment, the gesture detection module may be non-functioning if the device is running an application, which may be a different application to the state transfer application, that uses a particular state transfer gesture for some other purpose. For example, a device may be simultaneously executing two applications, one of which uses the state transfer gesture of the other application for a non-state transfer purpose.
Opaque Application Data Transfer Objects 66—an application provided data transfer object (DTO) that is represented as a byte buffer. This field may contain custom data but is typically a serialized object. In various embodiments, it may be preferable, though not essential, that the data is kept opaque so that the registration and relay server 20 does not need to have the application class files to instantiate/deserialize the object.

The state transfer module may be configured to send only the data that requires updating at the registration and relay server 20 in the update message 60. In many instances, it may not be necessary to include one or more of the LocationInfo 64, ReceiveOnly 65 or OpaqueAppDTO 66 fields. For example, LocationInfo is not sent when either it is not available or it has not changed beyond a threshold distance from the last sent location. After a location has been provided, if the location becomes unavailable the update can occur without the LocationInfo field. An update without LocationInfo continues to provide connectivity, allowing incoming state transfers from the registration and relay server to the device at any time, and also refreshes the OpaqeAppDTOs if provided by the Application Logic, for example if Claire finished playing against Bill then both Claire and Bill would refresh their OpaqueAppDTOs in an Update. ReceiveOnly is not sent if it has been sent and its value is not changed, which is typical of receive only devices (e.g. TV). OpaqueAppDTO set is not sent if it has not changed since the last set of OpaqueAppDTOs were sent, which is an application logic decision. For example, a game may change frequently but if the only relevant information shown during state transfer is who is playing whom then the OpaqueAppDTOs in the State Transfer Module are only updated when the player vs. player information changes. The Application Logic makes the decision when to update and calls an API on the State Transfer Module to update the OpaqueAppDTOs.

When the update message 60 is received by the Registration and Relay server 20, it is handled by an application message handler module 25. The handler module 25 creates or updates an entry in the registration table for the specific application identified in the AppName field 62 of the update message 60.

To further highlight the registration procedure, sample data values are included in FIG. 3. In this example, the application is a simple Tic Tac Toe game application with the package name "com.recursionsw.tictactoe". The gesture registered is a "shake" gesture which may be predefined within the gesture detection module 32. The OpaqueAppDTOs are bytes of a serialized application DTO that contains the username of this player and the opponent player. These parameters are shown as example message values of the EnableStateTransfer message 50.

An example update message 60 includes the same Application Name and OpaqueAppDTO as the EnableStateTransfer message 50. The device ID is "0xfe1bd437", derived from the specific device 12, and the AppInstanceId is 1304450513496. The device is able to initiate and receive state transfers and so the ReceiveOnly field of the example update message is set to "false". The LocationInfo field includes latitude and longitude coordinates for the device. The example registration table 28 is shown with these values in the respective fields after the update message has been received and handled by the application message handler module 25 of the registration and relay server 20.

In the example, the update interval is set at 120000 milliseconds. This is the interval at which the state transfer module will send update messages 60 to the registration and relay server 20. The update message provides two functionalities. First, it provides fresh data (e.g. location data, updated OpaqeAppDTOs) for running applications that have the state transfer module enabled. Secondly, even if no data needs updating, the update process provides a heartbeat to the Registration and Relay server 20, forcing a new connection if necessary. This ensures that the server 20 has a valid connection, e.g. socket pointer, allowing a possible relay of a state transfer to the device (i.e. as a recipient device) if requested.

Figure 7:
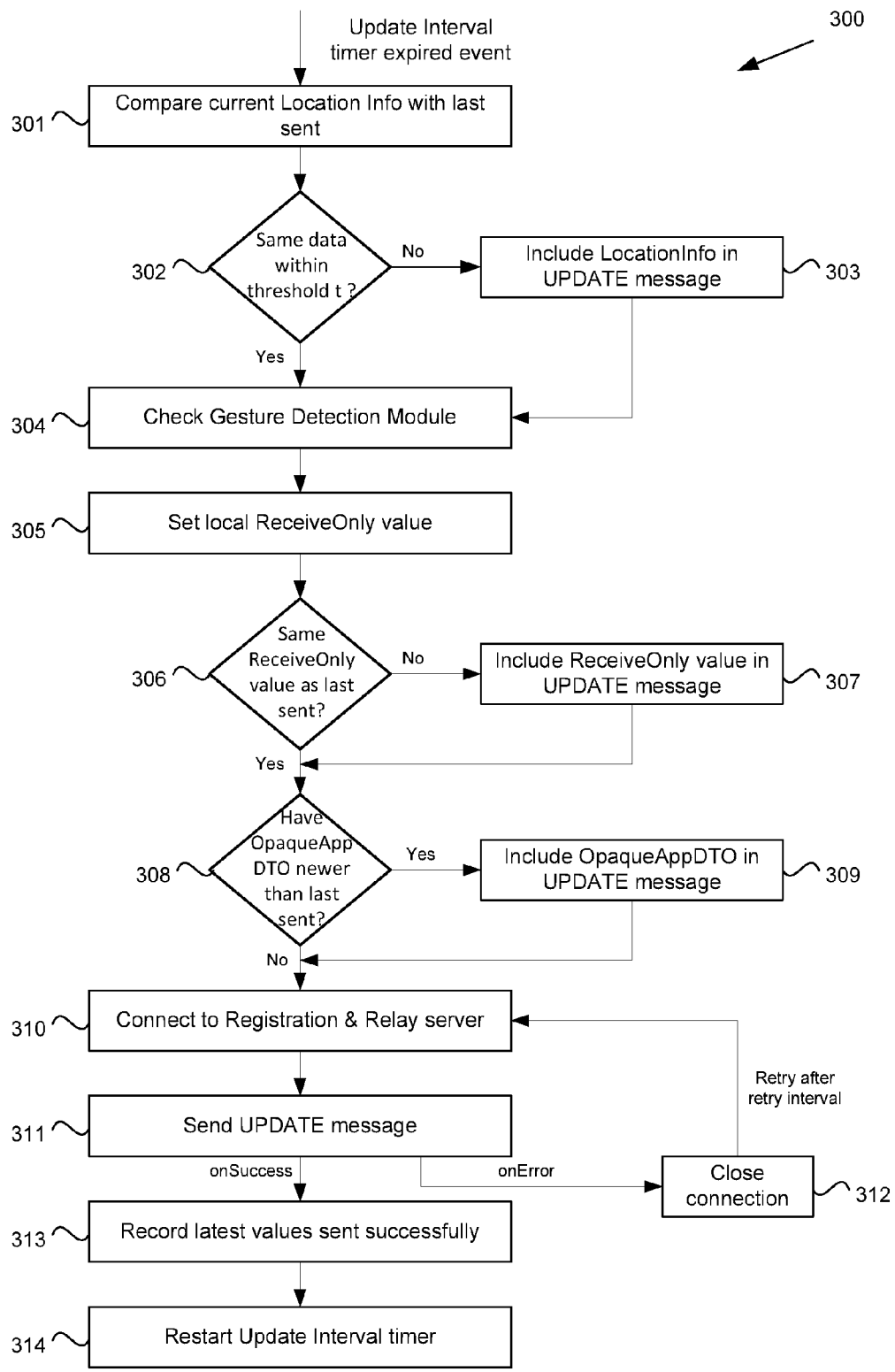
FIG. 7 depicts a flowchart for sending an Update message from a device.

FIG. 7 shows the process 300 undertaken by the state transfer module 32 when the update timer fires. At step 301, the state transfer module 32 compares the current Location Information received from the location module 34 with the last location information sent. If the location data has changed (determination 302), the latest location data is included in the Update message 60 (step 303). At step 304, the state transfer module 32 checks the gesture detection module 33 to determine if the gesture detection module 33 is available and functioning and sets the local ReceiveOnly value accordingly. If the current ReceiveOnly value has changed since the previous value sent (determination 306), then the ReceiveOnly value is added to the Update message 60 (step 307). At step 308, a determination is made as to whether the Opaque Application DTOs are newer than the last sent and if so, they are included in the Update message 60 (step 309).

Once all the field values of the Update message 60 have been determined and included in the Update message if necessary, including a current timestamp, a connection is made to the Registration and Relay server 20 (step 310) and the update message 60 is sent (step 311). If the sending of the update message 60 is unsuccessful, the connection can be closed (step 312) and tried again after a retry interval has lapsed. Once the update message 60 has been successfully sent from the state transfer module 32 to the registration and relay server 20, the state transfer module 32 locally records the last values sent (i.e. location info, receive only and opaque app DTO values) (step 313) and then re-sets the update interval timer (step 314).

Figure 8:
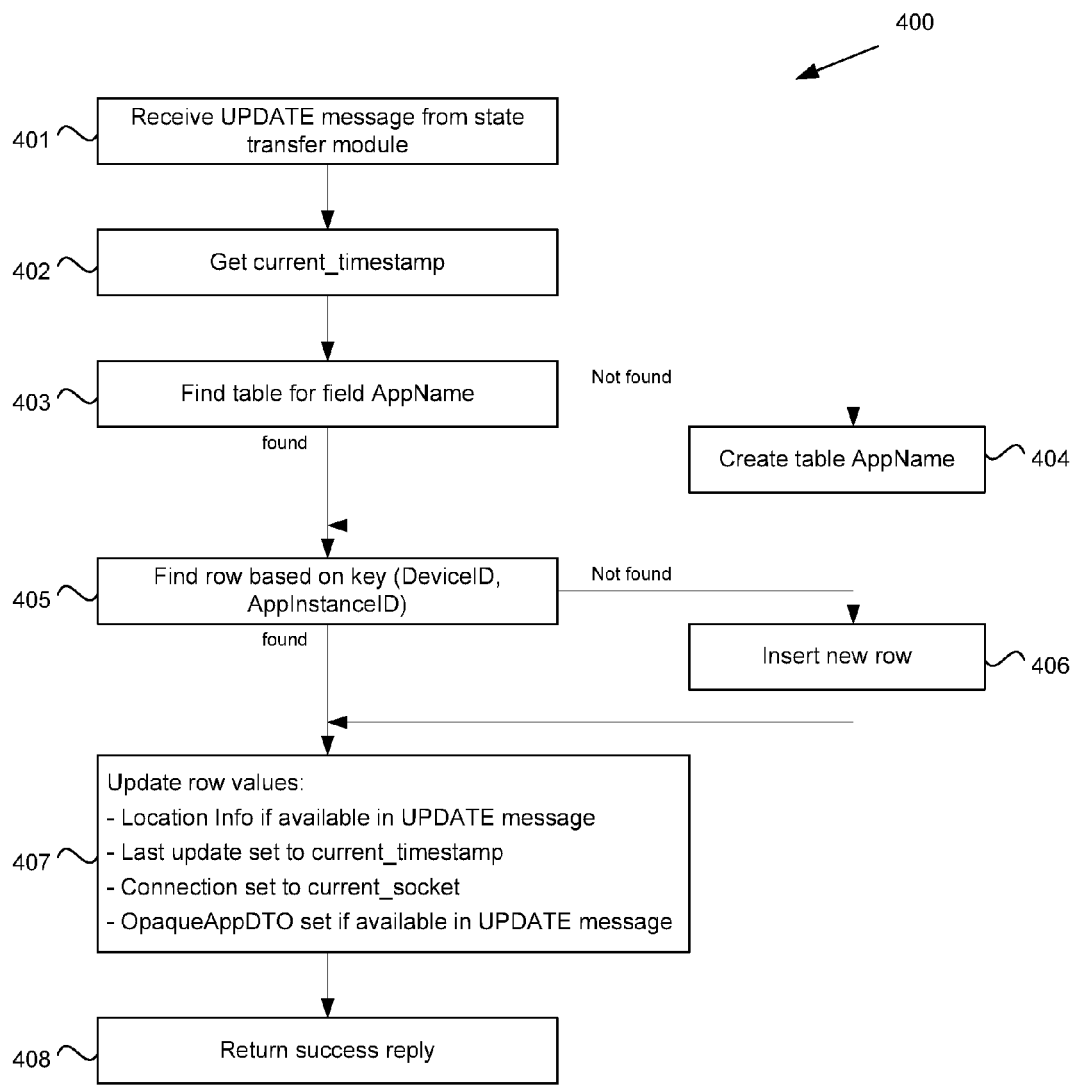
FIG. 8 depicts a flowchart for receiving an Update message in a registration and relay server.

An example of the update process undertaken at the registration and relay server 20 is depicted in the flowchart 400 of FIG. 8. At step 401, the application message handler module 25 of the registration and relay server 20 receives the update message 60 from the state transfer module 32 of an application executing on a device. At step 402, the message handler 25 extracts the current_timestamp and then searches for an existing registration table 24 for the application indicated by the AppName field 62 of the update message 60 (step 403). If no existing registration table for the application is found, a new registration table is created (step 404).

The message handler 25 then extracts the DeviceID 61 and the AppInstanceID 63 from the update message 60 and uses these values to search for the respective row in the registration table (step 405). If no corresponding row is found, a new row is inserted into the registration table (step 406). At step 407, the row values are updated with data from the update message and other relevant parameters. In particular embodiments, the location info and OpaqueAppDTO values are updated (if available), the last update value is set to the current_timestamp and the connection parameters are set to the current socket, being the one that the present UPDATE message arrived on. If all the update values are processed successfully, the message handler 25 sends a successful update response to the sending state transfer module (step 408), which may trigger the state transfer module to enter step 313 shown in FIG. 7.

In order to ensure efficient operation of the registration and relay server 20, the application message handler module 25 or some other module within the registration and relay server 20 may periodically perform a cleanup operation on the registration tables 22.

Figure 9:
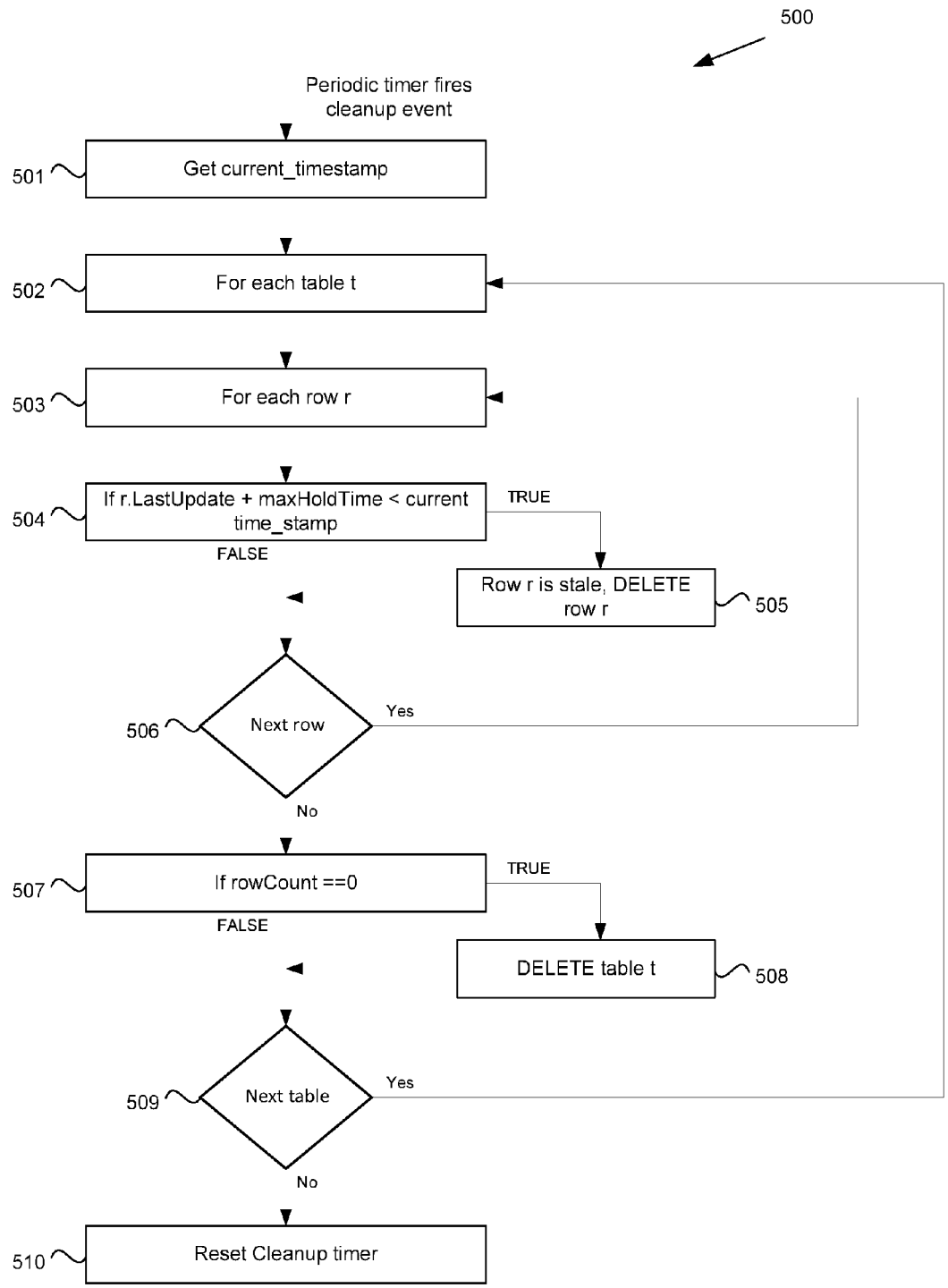
FIG. 9 depicts a cleanup process for the registration and relay server.

An example of the cleanup process is shown in the flowchart 500 of FIG. 9. At step 501 and in response to expiry of a cleanup timer, the cleanup module (e.g. the application message handler module 25) determines the current_timestamp which will be used in the cleanup analysis. Then a table loop is commenced (step 502) and within the table loop, a row loop is commenced (step 503). Within the row loop, if the last update of the particular row r is older than a maximum hold time, i.e. r.LastUpdate+maxHoldTime<current_timestamp (step 504), then the row is considered stale and the row is deleted (step 505). If the row is still considered fresh, the loop proceeds to select the next row (step 506) for the given table t. Once all rows have been processed, a row count is performed on the table t and if the row count is zero (step 507) then the table t is empty and can be deleted (step 508). The next table is then selected (step 509) and the table loop returns to step 502. When all tables have been processed, the cleanup operation is complete and the cleanup timer is reset (step 510).

The maximum hold time for a row may be a configurable or permanent parameter. It may be dependent on the application, the application instance, or other factors. In some examples, the maximum hold time may be of the order of 15 minutes. The max hold time should be greater than the Update Interval (otherwise table entries may be removed/re-added continually). There are two major configurations: 1) All first party code. In this case the server is under control of the application developer and it is expected that the application developer, (who chooses the Update Interval), will pick an appropriate max hold time (e.g. three times the length of Update Interval) to allow for occasional packet loss. The other configuration 2) where state transfer is offered as a service and the registration and relay server is a $3^{rd}$ party server. It is expected here that the service provider (developer of the registration and relay server and the State Transfer Module) will choose the max hold time value, and make it known to application developers (via documentation) as well as code it into the State Transfer Module so an error condition can be reported if the application logic developer chooses an Update Interval that is less that the max hold time of the $3^{rd}$ party registration and relay server.

Similarly, the Cleanup period may be a configurable parameter set by the application developer and/or the service provider of the registration and relay service or by other operators. The cleanup period may be dependent on the application, the volume of usage of the registration and relay service by the application, the size of storage and processing power at the registration and relay server 20, or on other factors that will be apparent to a person skilled in the art.

Figure 10:
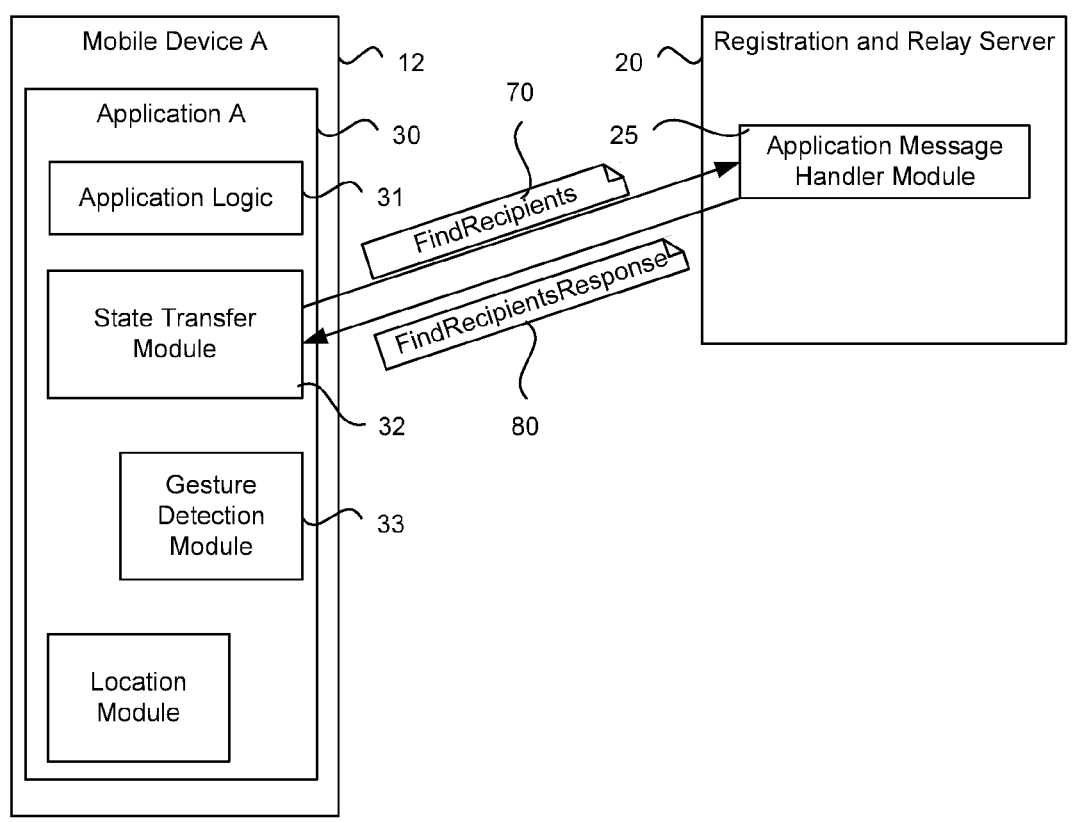
FIG. 10 depicts the components of the system performing a Find Recipients stage of the application state transfer process.
Figure 11:
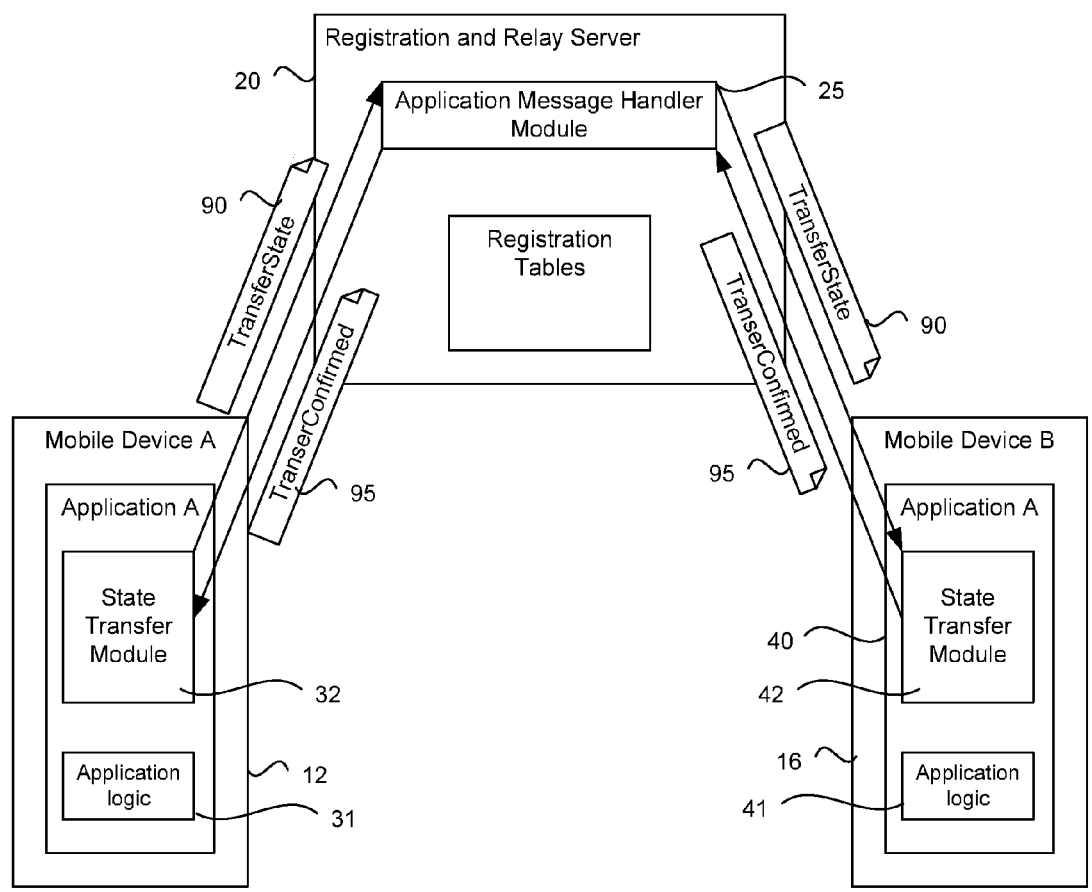
FIG. 11 depicts the components of the system performing a State Transfer stage of the application state transfer process.
Figure 12:
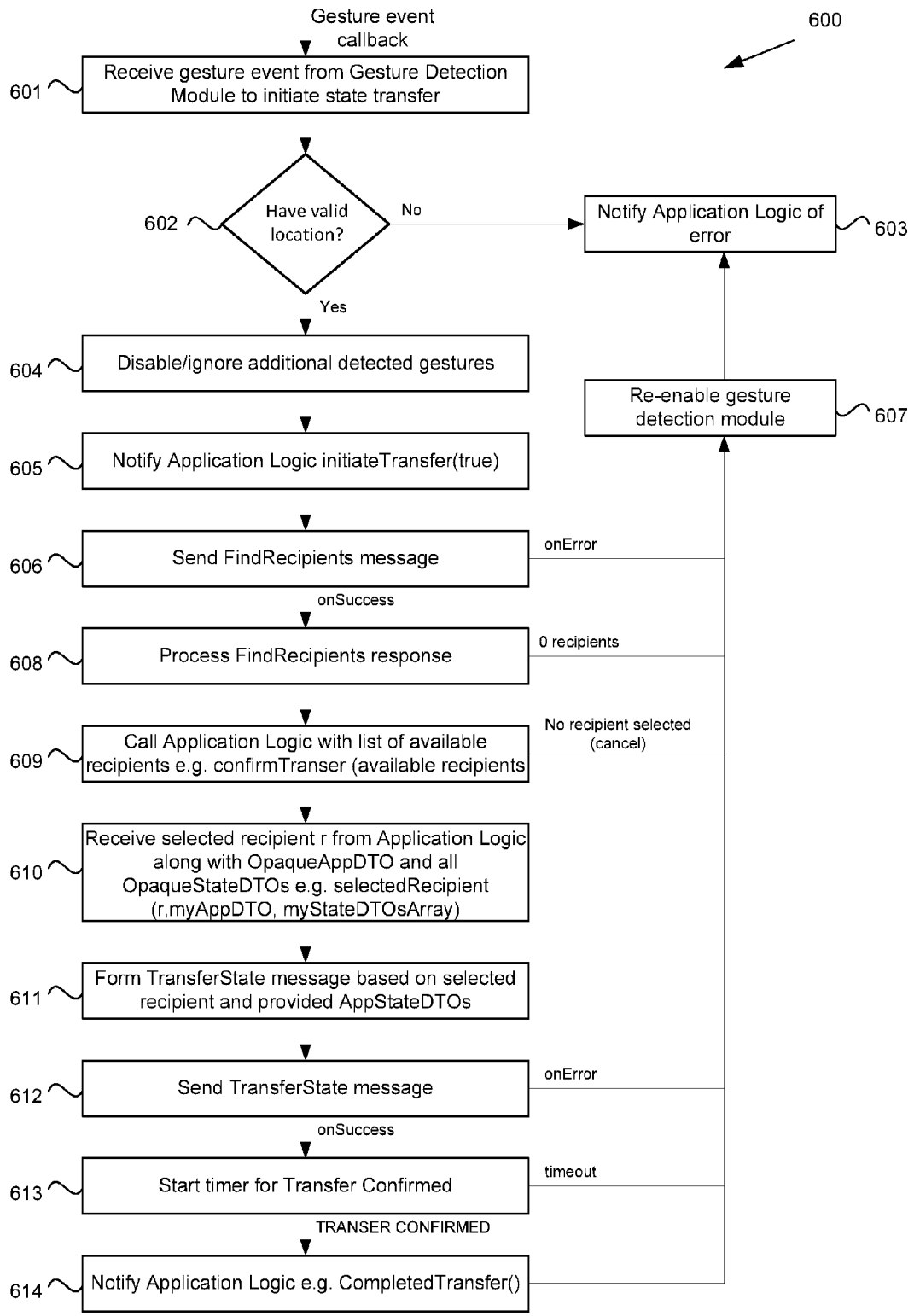
FIG. 12 depicts a state transfer process from an initiator device side.

FIG. 10 shows a first stage of a state transfer process in which a device 12, executing application 30, initiates the state transfer. The process depicted in FIG. 10 is a process for finding recipients to receive the state transfer. FIG. 11 shows a second stage of the state transfer process in which a transfer state message is provided to a recipient device. These processes are represented from the point of view of the state transfer module 32 of the transferring device 12 by the flowchart 600 of FIG. 12.

The process 600 is triggered when the gesture detection module 32 detects the predefined transfer gesture and provides a callback to the state transfer module 32. On receipt of the gesture detection callback by the state transfer module 32 (step 601), the state transfer module 32 first determines whether the device 12 has a valid location (determination 602). If not, the state transfer module 32 notifies the application logic 31 of an error (step 603). Otherwise, the state transfer module 32 proceeds to disable or ignore additional detected gestures from the gesture detection module 33 (step 604).

At step 605, the state transfer module 32 notifies the application logic 31 of the initiation of the state transfer process. The application logic 31 begins stabilizing the application state when the initiateTransfer( ) callback function is called by the state transfer module 32. Stabilizing the application state is dependent on the application logic. For example, in a multiplayer game that communicates moves to another server (not the registration and relay server) stabilizing the application might comprise pausing the game (changing the UI so another move cannot be made) and possibly sending a "paused" status to the game server.

Figure 13:
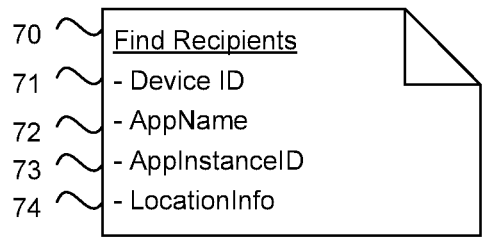
FIG. 13 depicts a Find Recipients message.

At step 606, the state transfer module 32 sends a FindRecipients message to the registration and relay server 20. An example of the FindRecipients message 70 is depicted in FIG. 13 and may include fields for Device ID 71, Application Name 72, Application Instance ID 73 and Location Info 74. The Location Info may be sent each time, or may be sent only if newer than the last information sent.

If the state transfer module 32 is unable to successfully send the FindRecipients message 70, e.g. due to a lack of connection to the registration and relay server 20, the state transfer module 32 notes an error meaning that the application state cannot be transferred. The state transfer module 32 re-enables the gesture detection module 33 (step 607) and notifies the Application Logic of the error (step 603) so that the application can continue executing on the device 12.

Figure 14:
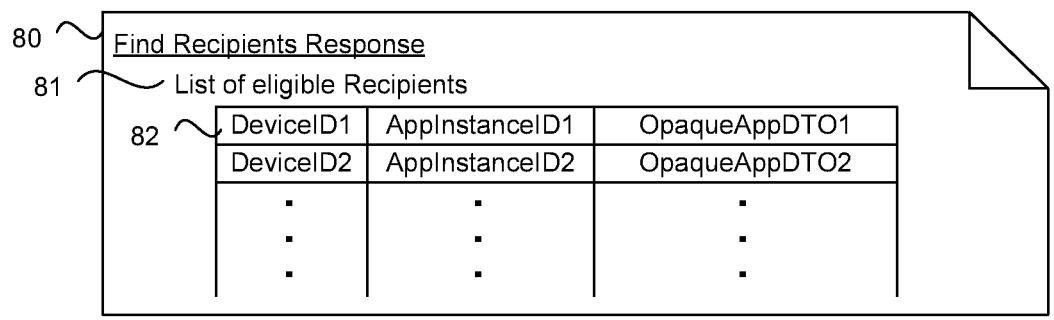
FIG. 14 depicts a Find Recipients Response message.

At step 608, the state transfer module 32 processes a FindRecipientsResponse message, an example 80 of which is shown in FIG. 14. The FindRecipientsResponse message 80 may include a list of available recipients 81. Each available recipient in the list 81 may be represented by a row 82 that specifies a DeviceID, AppInstanceID and OpaqueAppDTO. The list of available recipients 81 may be determined from location data, a pre-configured receiver list for that device or other parameters that may be configured by the user of the device 12, the application developer of application 30 or the service provider of the registration and relay server 20.

If the FindRecipientsResponse message contains no recipients, then the state transfer is unable to proceed and steps 607, 603 are performed as described above. If there are one or more recipients, these are provided to the Application Logic 31 (step 609) for confirmation by the user of the device 12.

The Application Logic 31 may present a user interface to the user of device 12 to enable the user to select an available recipient from the available recipient list. The list may be presented in a non-ordered manner, or some processing and/or filtering of the list may be performed to order the list according to various criteria, such as proximity, previously used recipients, preferred recipients, historical data, available device types of recipients, etc. This filtering may be performed within the device 12, e.g. by the state transfer module 32 or the application logic 31, or may be performed in the registration and relay server 20. The selection list of recipients provided to the user may include some instantiating (deserializing) of the OpaqueAppDTO for each recipient (derived from the respective array 82 of the entry in the list 81 of the FindRecipientsResponse 80) to provide meaningful, application specific, context. For example, a mapping application may indicate a device type and an area that the mapping application of the device is currently viewing, whereas a gaming application such as a TicTacToe game may specify a device type as well as the players currently playing on the device or whether the game is idle.

The Application Logic 31 is responsible for a number of tasks to conduct the state transfer process after receiving the nearbyRecipients message. The Application logic 31 may respond to the callback without selecting a recipient, which cancels the transfer. If no recipient is selected, the state transfer process is cancelled and the process returns to steps 607, 603. Otherwise, the selected recipient is received into the state transfer module 32 from the application logic 31 along with the OpaqueAppDTO. This OpaqueAppDTO is the most up-to-date one for the initiator's application, not the OpaqueAppDTO for the selected recipient. The initiator sends his current OpaqueAppDTO along with all OpaqueStateDTOs so that a recipient can show the user a friendly message, (e.g. "Incoming tic-tac-toe game from John (currently playing Bill). Take John's place?") and all OpaqueStateDTOs (step 610).

If a recipient is selected, the application logic 31 stabilizes the application state and disallows further application state changes due to the transfer in progress. The Application Logic selects, or allows the selection by the user, of a recipient in the ConfirmTransfer message and provides an OpaqueAppDTO in the reply. The Application Logic 31 generates a platform independent representation of the application state in the form of an array of one or more Opaque State DTOs which it provides to the state transfer module 32. The State DTOs describe the current state of execution of the application sufficient for that state to be continued on another device.

The OpaqueAppDTO only represents a summary of a recent application state for a remote application (e.g. who is playing whom). The OpaqueStateDTOs need to contain all the information required for the receiving application instance to be able to continue. What constitutes the required information of the OpaqueStateDTOs is application specific. EXAMPLE 1: A single player game, e.g. the 2D game Doodle Jump. OpaqueAppDTO may just have the player name and a fairly recent score. OpaqueStateDTOs might "only" transfer over the game state (the generated game board, the location of the player within the game board, including speed of the player in 2D jumping/falling, the score, the name of the original player, the last accelerometer/compass/gyro positions of the sending device at the time the game was paused for transfer, etc). Since this is not a networked game any network session state to a server is not needed in the OpaqueStateDTOs since a connection, e.g., to the high score server can be established/reestablished as needed on the receiving device. The same applies for network connections for serving ads, the connections are established/reestablished as needed. EXAMPLE 2: A navigation application that does not store map data on the phone but on a server e.g. Google Navigation. The OpaqueAppDTO may just have the start and end points and the nearest waypoint to the location of the user. The OpaqueStateDTOs may include the start and endpoints, all other waypoints, the undo history if the original user has selected alternate routes (if the app supports undo), the location of the original user at the time of the state transfer, the accelerometer/compass/gyro values at the time of the state transfer, the current map tiles being displayed, the current map tiles in the application cache, the map features enabled (e.g. traffic, points of interest), etc. In addition, since this application has a stateful connection to a map server, the OpaqueStateDTOs would also include the session identifier(s) needed to reconnect with the server and continue interacting, any security tokens needed for reestablishment if the session was secure, etc. EXAMPLE 3: A two-player 3D game with a game server, e.g. a first person shooter, player vs. player on a game map. The OpaqueAppDTO could have the two players' names and the name of the level being played because this is the information required to enable a recipient to determine if they want to receive the state transfer. The OpaqueStateDTOs could contain the current location on the game board of the transferring player's character, movement information of the players character (acceleration/velocity in 3D), the state of the originating player's device's GPS/accelerometer/compass/gyro, recent history of player's movement, the current weapon equipped, the state of the ammo for the weapon, same for secondary weapon, the location on the game map of in game artifacts e.g. previously deceased characters and weapons dropped, other game mode state (e.g. number of kills vs. number of times killed, or time remaining in the match). In this example the 3D game has the map info local on the device and is communicating game state through a server. The OpaqueStateDTOs may also have the internet address of the current server being used, any player identifiers being used in communication with the server, and session state tokens for reestablishing the connection to the game server from the recipients device.

Figure 15:
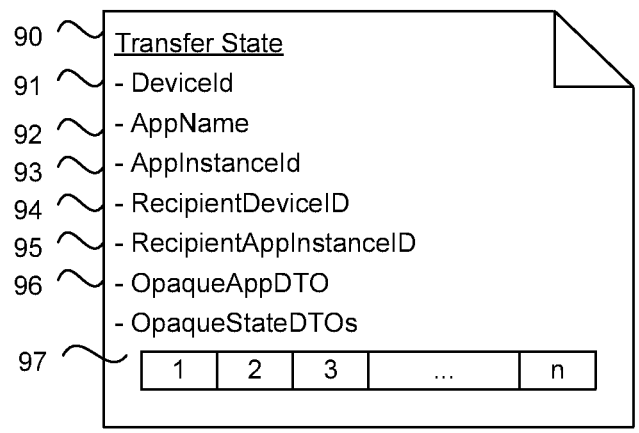
FIG. 15 depicts a Transfer State message.

At step 611, the state transfer module 32 forms a TransferState message, an example 90 of which is shown in FIG. 15. The TransferState message 90 may specify the DeviceID 91, AppName 92 and AppInstanceID 93 of the device 12 as well as the Recipient DeviceID 94 and Recipient AppInstanceID 95 of the selected recipient device. The Transfer Message 90 also includes the OpaqueAppDTO 96 and an array 1 to n of OpaqueStateDTOs 97.

The TransferState message 90 is sent at 612 and a confirmation timer is set. The state transfer message 90 may be sent as a single message or as a stream of messages transferred in parts to be reassembled at the recipient device r.

If a TransferConfirmed message 95 is received before a timeout, then the state transfer module 32 notifies the application logic 31 of the successful state transfer (step 614).

Figure 16:
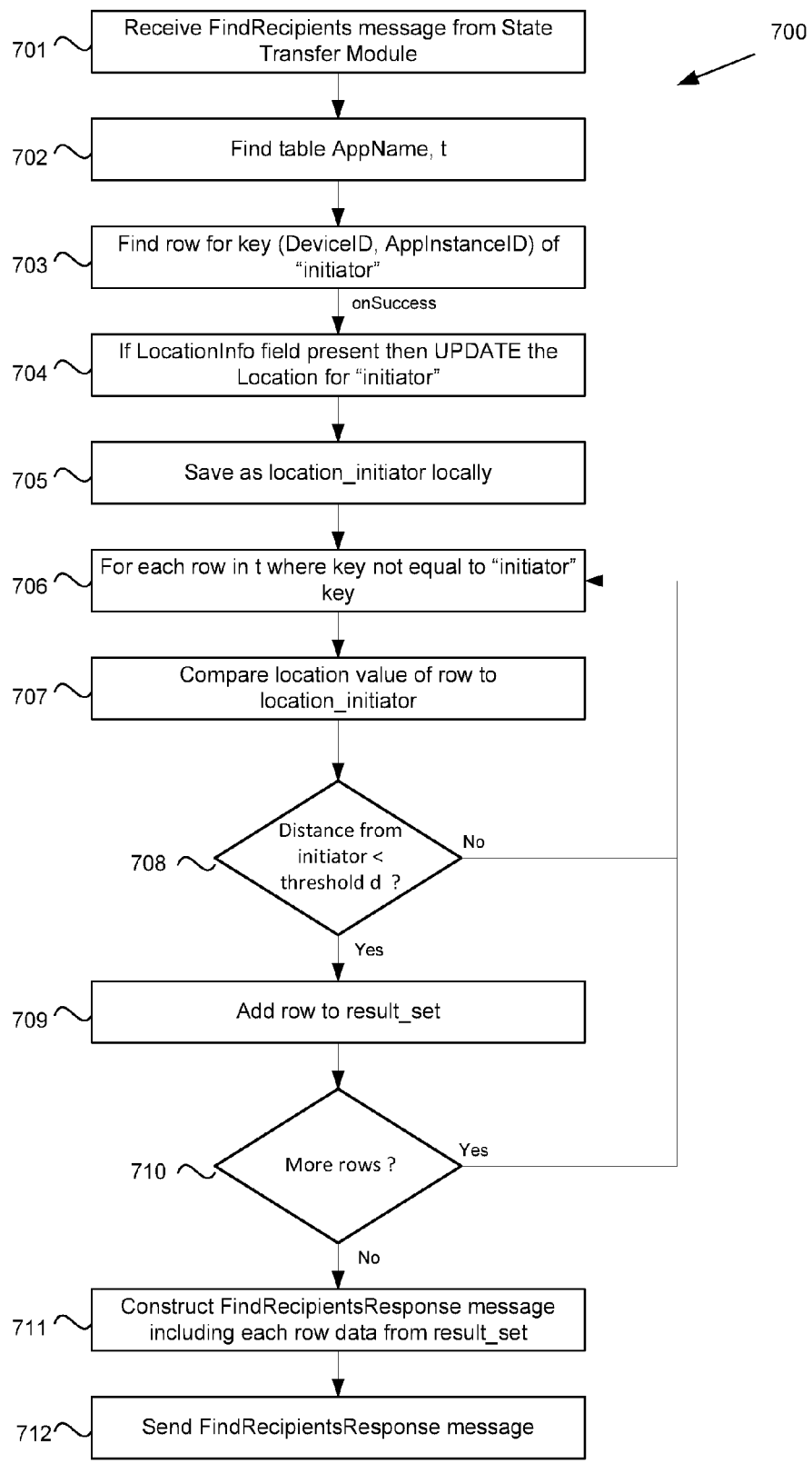
FIG. 16 depicts a Find Recipients process from the registration and relay server side.

FIG. 16 shows a flowchart 700 depicting the process undertaken by the registration and relay server 20 for finding recipients. At step 701, the Application Message Handler Module 25 of the registration and relay server 20 receives the FindRecipients message 70 from the state transfer module 32 of the initiating device 12. At step 702, the handler module 25 finds the table "t" corresponding to AppName extracted from field 72 of the FindRecipients message 70 and finds the row for key (DeviceID, AppInstanceID) of the initiating device 12 (step 703). If LocationInfo is present in field 74 of the FindRecipients message 70, then the location info of the "initiator" is updated (step 704) and saved locally within the registration and relay server 20 as the location of the initiator device (step 705). The process 700 then enters a loop 706 over each row in table t where the key is not equal to the initiator key. For each row in t, the location value of the row is compared to the locally stored location initiator value (step 707). If the distance from the initiator is less than a configurable threshold d (step 708) then the row is added to a result set (step 709). If more rows are present (determination 710), then the process loops to the start of the loop 706. Once all rows have been processed, the message handler 25 constructs a FindRecipientsResponse message 80 including each row of data from the result set (step 711). At step 712, the message handler 25 returns the FindRecipientsResponse message 80 to the state transfer module 32 of the initiator device 12.

The FindRecipients process 700 thus described finds eligible transfer recipients based on a proximity threshold to the initiator device. In alternative embodiments, other methods may be used for determining eligible receiving devices. For example, in a home based network, the receiving devices may be preconfigured for certain applications. The particular method for determining the eligible recipients is not considered pertinent to the broadest aspects of the disclosure and all methods for determining eligible recipients are intended to be encompassed herein.

The eligible recipients may be a prespecified set (e.g. certain players in the game example) that is provided with the Find Recipients message. For this to work, since the OpaqueAppDTO contains the needed information (player names) and it is not directly accessible to the registration and relay server, the Find Recipient message would also need to provide a Comparator object which would have the code to unpack each OpaqueAppDTO on the registration and relay server and determine if it is an eligible recipient. This mechanism makes selecting the eligible recipient(s) completely custom and under control of the application developer. Each different application (AppName) could then have their own custom logic for selecting recipients. A first application may use location, a second application may look at a player's history and only allow selecting recipients that the user has previously played, etc. Other techniques that may be implemented are: longest idle user (i.e. oldest OpaqueAppDTO update), same security domain (where the opaque application DTOs are encrypted with the same public key), and same network ISP (based on incoming network connections and allows matching within an ISP, e.g. deliver eligible recipients only if on Sprint 3g data network). Other techniques for selecting the eligible recipients will be apparent to a person skilled in the art and all such techniques are considered to be encompassed herein.

Figure 17:
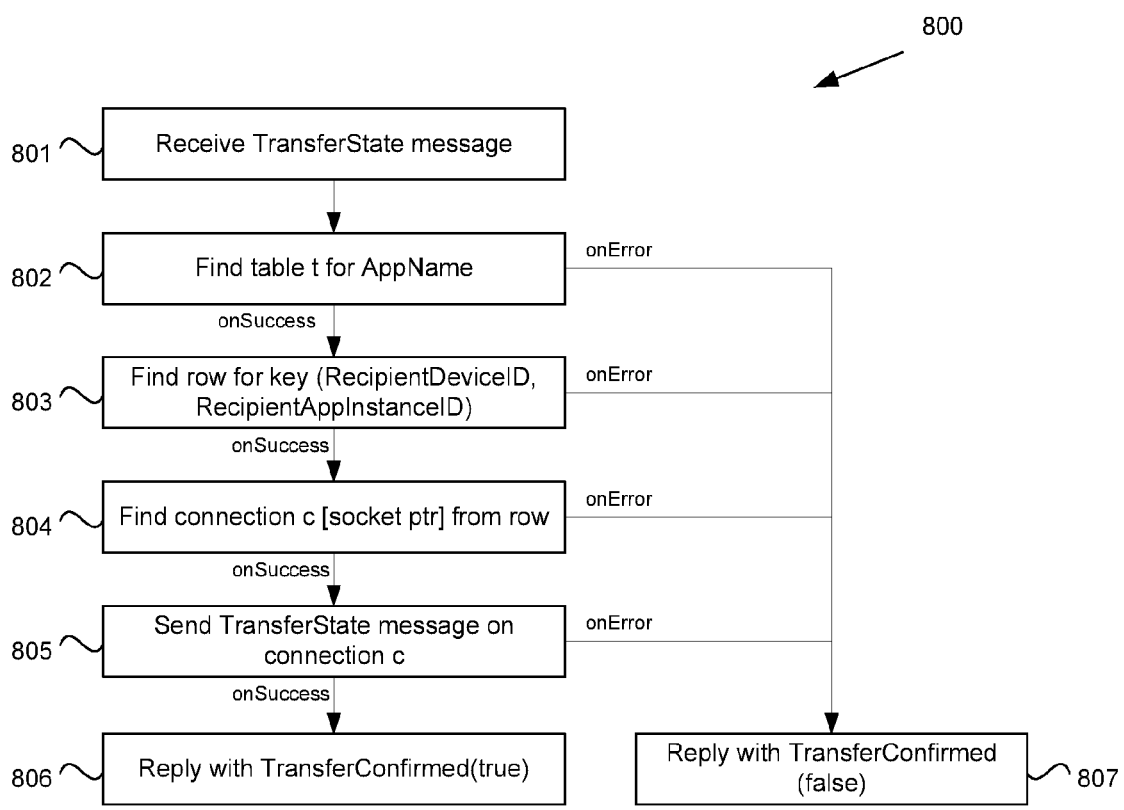
FIG. 17 depicts a process for processing a Transfer State message in the registration and relay server.

In FIG. 17 there is shown a process 800 undertaken by the registration and relay server 20 for receiving and processing the TransferState message 90. At step 801, the message handler 25 receives the TransferState message 90 from the state transfer module of the initiator device 12 (corresponding to step 612 of the process 600 of FIG. 12).

The message handler 25 processes the TransferState message 90 by first finding table t for AppName indicated in field 92 of the TransferState message 90 (step 802). The message handler 25 then finds a row corresponding to the RecipientDeviceID 94 and RecipientAppInstanceID 95 indicated in the TransferState message 90 (step 803) and finds the connection c indicated in the respective row (step 804). The message handler 25 then forwards the TransferState message 90 to the indicated recipient device 16 on connection c (step 805). If successfully transferred, the message handler 25 responds to the state transfer module 32 of the initiator device 12 with a successful TransferConfirmed message 95 (step 806). If any of steps 802 to 805 fail, the message handler 25 responds to the state transfer module 32 of the initiator device 12 with an unsuccessful TransferConfirmed message 95 (step 807).

Figure 18:
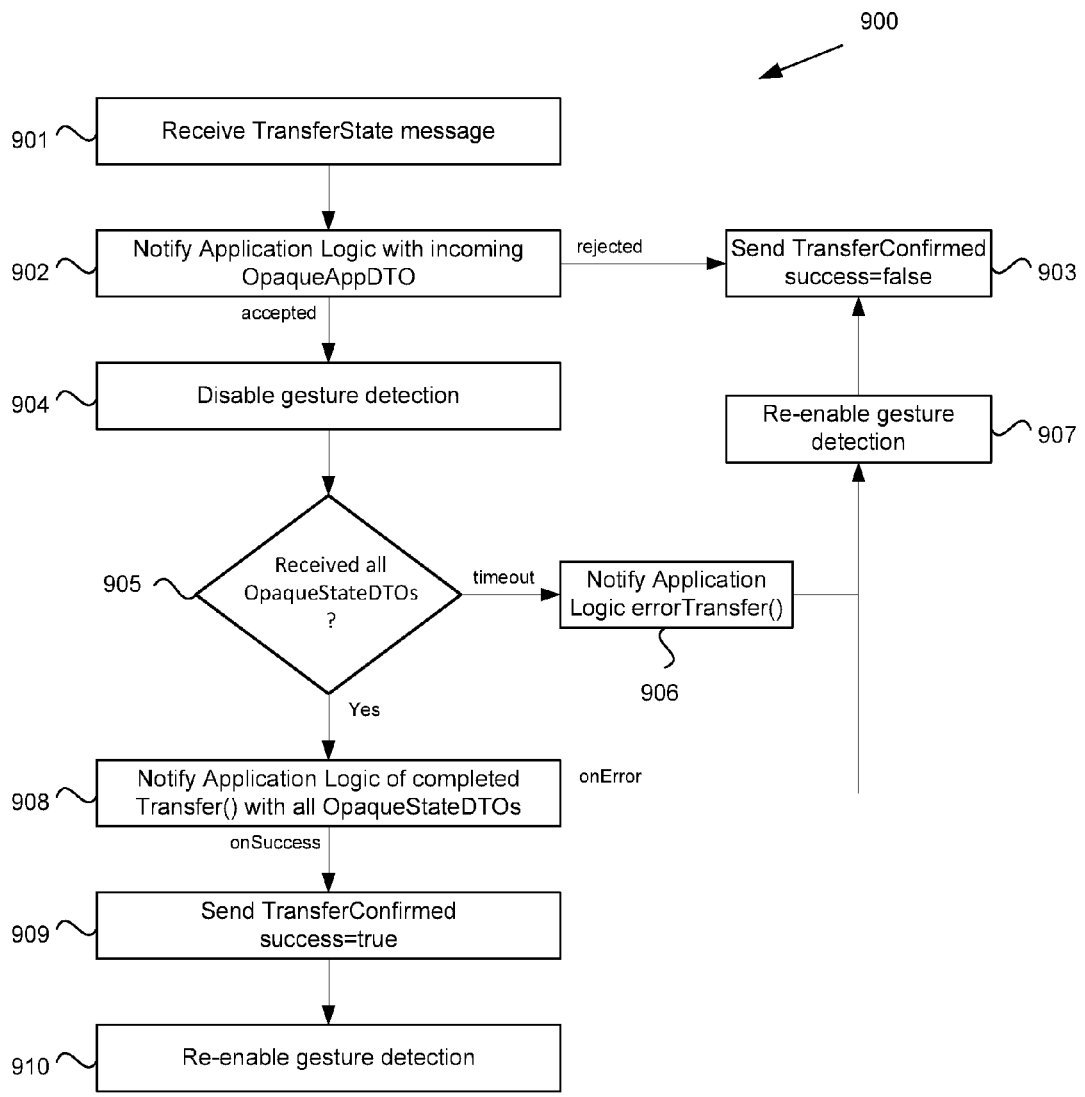
FIG. 18 depicts a flowchart for performing the state transfer process from the recipient device side.

In FIG. 18, considered with the system depiction of FIG. 11 there is shown a process 900 undertaken by the receiving device 16 in receiving the state transfer. Having been selected as a recipient, it can be assumed that the receiving device 16 includes application logic 41 for executing an instance of the application 40 that is the equivalent of the application 30 in the initiator device 12. The instance 40 of the application may be specific to the parameter set of the receiving device 16. The TransferState message 90 is received into the state transfer module 42 of the receiving device 16 at step 901. At step 902, the state transfer module 42 notifies the Application Logic 41 with the incoming OpaqueAppDTO read from field 96 of the TransferState message 90. This allows a friendly message to be displayed to the recipient device user, if the application logic developer chooses, and the user can decide whether to accept the state transfer. If rejected, the state transfer module 42 returns a TransferConfirmed(false) message 95 to the registration and relay server 20 (step 903). Otherwise, if accepted, the state transfer module proceeds to disable the gesture detection module 43 (step 904). If the state transfer module 42 does not successfully receive all the OpaqueStateDTOs (determination 905), then the state transfer module 42 notifies the Application Logic 41 of a transfer error (step 906), enables the gesture detection module 907 and sends a TransferConfirmed(false) 95 message to the registration and relay server 20 (step 903). If the OpaqueStateDTOs are all successfully received (905), then the state transfer module 42 notifies the application logic 41 of the completed transfer (step 908). If the notification is successful, the state transfer module 42 returns a TransferConfirmed(true) message 95 (step 909) and then re-enables the gesture detection module 43 (step 910). At this point, the application state of the application 30 that was executing on device 12 has been transferred to device 16, thereby enabling the execution of the application to continue from device 12 to device 16. In the TicTacToe example discussed above, the state DTOs from device 12 may describe the game as "John playing Bill", John's turn, and a description of the game board. Once transferred to the recipient device, John (or user B on John's behalf) can continue his turn at the game, but now playing through recipient device 16.

When the receiving device accepts a state transfer, the recipient device stops the current execution of the application and overwrites the current State DTOs in the recipient device. The up-to-date OpaqueStateDTO(s) that arrive with the OpaqueStateDTOs allow the interruption (handled by the State Transfer Module calling the Application Logic asynchronously) by the application logic which can be programmed to e.g. pause the application and pop up a window allowing the user to accept/reject the incoming state transfer. The OpaqeAppDTOs allow for a friendly message during this process. If accepted, the current state is replaced with the incoming state. If the recipient, e.g. Zack, was playing a game with Yuri, upon accepting the state transfer Zack's application logic could first terminate the game so that Yuri would see a message "Player Zack left game" . . . and then Zack's application would replace the game state with the state in the incoming OpaqueStateDTOs. In some instances, reinitialization of the application logic may be required just prior to accepting the OpaqueStateDTOs.

Upon successful transfer of the application state from the initiating device, the Application Logic 31 in the initiating device may reinitialize itself (clearing out any state DTOs) and also reinitialize the State Transfer Module. If the application logic continues to run the application, having reinitialized itself, the application logic should go through the process described in FIG. 3 which will provide a new OpaqueAppDTO (representing idle state info), thereby making the device available to receive an incoming state transfer from another device. Alternatively, the application logic may terminate the application. In this case, any info on the registration and relay server would be stale for a little while (no connection would succeed) and then it would be cleaned up by the process shown in FIG. 9. Alternately, the State Transfer Module itself can, after notifying the Application Logic of a successful transfer, unregister the gesture detection handler (e.g. "shake") to prevent transfer of an idle state, clear any cached OpaqueAppDTO(s), etc.

In the presently discussed examples, the location data is relevant for selecting the eligible recipient devices based on a proximity criteria. In various embodiments, particularly depending on the application, the location information may not be required for determining when or where to transfer the state of the application. Other criteria that may be used to select an eligible transfer recipient include a pre-configured list of devices, devices within a communication range of the initiator device, e.g. peer to peer, preferred devices (e.g. friend list), etc.

In general, the same type of application will be required to be running on both the initiator device and the recipient device, at least in an idle state, in order for the recipient device to be selected as an eligible device for the state transfer. However, the initiator device and the recipient device need not be the same platform. For example, an iPhone can transfer state to an Android phone and/or to a PC. In some embodiments, it may be possible that the state transfer can be made to a device that has the application in memory but is not currently executing the application. The state transfer may trigger the application to begin execution in the recipient device so that it may receive the state DTOs of the transfer. For example, an application starts, registers with a long updateInterval, and dies, but can be restarted on the device via a device and application specific notification. On the registration and relay server during a state transfer, the registration and relay server tries the socket which fails because there is no application running anymore. The registration and relay server may then send the notification message that starts the application which reregisters a good connection with the registration and relay server, thereby allowing the state transfer to proceed. This embodiment may be particularly useful in situations where the eligible recipients are selected from a preferential list, regardless of the current application state on the device.

In embodiments where the transfer is triggered by a gesture, only the initiator device is required to have some form of gesture detection device. The recipient device merely needs to be receptive to receiving a state transfer and does not need the capability to itself transfer an application state. In some circumstances, it may be desirable for a user to transfer a state to a first device and then, later, have the application state, evolved as it may be, returned to the initiator device or forwarded onto some other device. Thus, the capability to transfer state may be one of the selection criteria used to select an eligible recipient device. The transfer state capability may be pre-selected by the registration and relay server 20 and/or may be presented on the initiator device as a parameter of the recipient devices, e.g. in the data 82 of the FindRecipientsResponse message 80 (FIG. 14), thereby enabling the transferring user to select whether or not the recipient device is transfer state capable.

The state transfer module may be configured to refuse any further state transfers if the device is already executing a transferred state application.

Developers may add application state transfer to a vast array of applications, similar to adding in an advertisement SDK, without the need to solve problems in their application logic.

Examples of applications that could benefit from a state transfer capability include, without limitation, mapping and navigation applications, weather applications, financial analysis applications, video/TV viewer applications, turn based game applications, puzzle game applications, etc.

The platform independent nature of the above described solutions removes the requirement for custom code per parameter set to solve several related problems and enables easy application state transfer (gesture identification, network unreliability, firewall and NAT traversal, locating devices, computing nearness of devices, platform independent data representation of application state e.g. for iPhone, Android, PC, etc, reliable confirmation of successful state transfer).

The state transfer module may be provided as a plug-in module that uses APIs that provides the architecture, messaging, and data representation required for cross-platform state transfer of arbitrary applications. The APIs may be based on the present assignee's proprietary Voyager platform which enables the development of platform independent applications. Further details of the Voyager platform are described in the present assignee's co-pending patent applications, U.S. patent application No. 13/151,594 filed Jun. 2, 2011, now U.S. Pat. No. 9,250,883, U.S. patent application No. 13/151,671 filed Jun. 2, 2011, U.S. patent application No. 13/078,948 filed Apr. 2, 2011, now U.S. Pat. No. 9,244,741, and U.S. patent application No. 13/078,950 filed Apr. 2, 2011, now U.S. Pat. No. 9,002,994, the entire contents of each of which are incorporated herein by reference.

In the above described embodiments, the user may be presented with an eligible recipient list from which the user selects a recipient for the state transfer. In alternative embodiments, such as when the transfer is within a local network, e.g. a home based network, the transfer may be automatically configured to occur between two known devices that may be within a direct communication range of each other. Thus, by using the gesture or other transfer act (e.g. menu driven), the user at the initiator device 12 may cause a direct transfer from the initiator device 12 to the recipient device 16. In such embodiments, it may not be necessary to employ the registration and relay server 20 and it may not be necessary to perform the process of determining the eligible recipient devices, e.g. based on location.

The components of the system may be embodied in hardware, software, firmware or a combination of hardware, software and/or firmware. In a hardware embodiment, each device may comprise a processor and an operatively associated memory that stores instructions, executable on the processor for performing the application and embodying the modules such as the state transfer module, gesture detection module, location module. The registration and relay server may include a processor and operatively associated memory that stores executable instructions for embodying the application message handler module as well as providing one or more memories for storing the registration tables.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method for transferring a state of an application on a first device to a second device, the method comprising:
executing the application on the first device;
detecting a transfer act;
generating, on the first device, a platform independent representation of an application state of the application;
determining a recipient device comprising accessing a relay server that maintains one or more registration tables of registered devices that are configured to receive an application state transfer for the application to determine an eligible recipient device that is currently executing the application, wherein the relay server receives regular updates of registration table information from the registered devices; and
providing the platform independent representation of the application state from the first device to the recipient device, wherein the executed application on the first device continues to execute on the recipient device based on the application state;
wherein generating the platform independent representation of the application state comprises generating one or more application state data transfer objects that describe the state of execution of the application on the first device;
wherein by sharing the application state from the first device to the recipient device, the application is able to continue running on the recipient device from the shared state;
wherein determining the recipient device comprises:
provide a find recipients request from the first device to a server;
determining one or more eligible recipients in the server based on one or more criteria; and
indicating the one or more eligible recipients from the server to the first device.

2. The method of claim 1 comprising:
receiving the platform independent representation of the application state into the recipient device; and
updating an application state of the application executing in the recipient device to the platform independent representation of the application state received from the first device.

3. The method of claim 1 wherein the one or more criteria comprises a location criteria.

4. The method of claim 1 wherein the one or more criteria comprises that an eligible recipient device has a current connection with the server.

5. The method of claim 1 wherein providing the platform independent representation of the application state to the recipient device comprises:
providing the platform independent representation of the application state from the first device to the server; and
providing the platform independent representation of the application state from the server to the recipient device.

6. The method of claim 1 comprising:
displaying the one or more eligible recipients on the first device; and
receiving a user input that selects the recipient device from the one or more displayed eligible recipients.

7. The method of claim 1 wherein the recipient device is selected from one or more preconfigured devices.

8. The method of claim 1 wherein detecting the transfer act comprises:
detecting a gesture;
determining that the gesture correlates to a transferring the application state from the first device.

9. A system comprising:
a first device executing an application comprising:
application logic for executing the application;
a state transfer module; and
a gesture detection module;
a server; and
one or more second devices;
wherein the state transfer module receives a gesture detection from the gesture detection module;
wherein the state transfer module communicates a find recipients request to the server in response to receiving the gesture detection;
wherein the server determines one or more eligible recipients for an application state transfer from the first device from the one or more second devices comprising accessing one or more registration tables of registered devices that are configured to receive an application state transfer for the application to determine an eligible recipient device that is currently executing the application, wherein the registration tables are regularly updated with information from the registered devices;
wherein the server communicates the one or more eligible recipients of the application state transfer;
wherein the first device selects an eligible recipient as a recipient device;
wherein the first device communicates the selection of the recipient device and a platform independent representation of the application state to the server comprising one or more application state data transfer objects that describe the state of execution of the application on the first device;
wherein the server communicates the representation of the application state to the recipient device;
wherein the recipient device receives the representation of the application state from the server; and
wherein the recipient device executes the application including the application state received from the server;
wherein determining the recipient device comprises:
providing a find recipients request from the first device to a server;
determining one or more eligible recipients in the server based on one or more criteria; and
indicating the one or more eligible recipients from the server to the first device.

10. The system of claim 9 wherein the server determines the one or more eligible recipients based on one or more criteria.

11. The system of claim 10 wherein the one or more criteria comprises a location criteria.

12. The system of claim 9 wherein the first device updates the server while the first device is executing the application in order to maintain the first device as a potential eligible candidate to receive a state transfer request.

13. A non-transitory computer readable medium of a device comprising instructions for:
executing an application;
detecting a transfer act;
generating, by the device, a platform independent representation of a state of execution of the application in the device comprising one or more application state data transfer objects that describe the state of execution of the application on the device, in response to detection of the transfer act;
determining a recipient device comprising accessing a relay server that maintains one or more registration tables of registered devices that are configured to receive an application state transfer for the application to determine an eligible recipient device that is currently executing the application, wherein the relay server receives regular updates of registration table information from the registered devices; and
communicating the state of execution of the application from the device to the recipient device on a network, wherein the executed application continues to execute on the recipient device based on the state of execution;
wherein determining the recipient device comprises:
providing a find recipients request from the first device to a server;
determining one or more eligible recipients in the server based on one or more criteria; and
indicating the one or more eligible recipients from the server to the first device.

14. The non-transitory computer readable medium of claim 13 comprising instructions for:
detecting a gesture; and determining if the gesture is correlated with the transfer act.

\* \* \* \* \*